US011296534B2

(12) United States Patent
Sherman et al.

(10) Patent No.: US 11,296,534 B2
(45) Date of Patent: Apr. 5, 2022

(54) WIRELESS CHARGING MANAGEMENT SYSTEM

(71) Applicant: POWERMAT TECHNOLOGIES LTD., Neve Ilan (IL)

(72) Inventors: Itay Sherman, Hod Hasharon (IL); Amir Salhuv, Nes Ziona (IL)

(73) Assignee: POWERMAT TECHOLOGIES LTD., Petah Tikva (IL)

(*) Notice: Subject to any disclaimer, the term of this patent is extended or adjusted under 35 U.S.C. 154(b) by 431 days.

(21) Appl. No.: 16/480,929

(22) PCT Filed: Jan. 24, 2018

(86) PCT No.: PCT/IL2018/050092
§ 371 (c)(1),
(2) Date: Jul. 25, 2019

(87) PCT Pub. No.: WO2018/138726
PCT Pub. Date: Aug. 2, 2018

(65) Prior Publication Data
US 2019/0393713 A1 Dec. 26, 2019

Related U.S. Application Data

(60) Provisional application No. 62/450,586, filed on Jan. 26, 2017.

(51) Int. Cl.
H02J 7/02 (2016.01)
H02J 50/80 (2016.01)
(Continued)

(52) U.S. Cl.
CPC ............. *H02J 7/025* (2013.01); *H02J 50/10* (2016.02); *H02J 50/80* (2016.02); *H04B 5/0037* (2013.01);
(Continued)

(58) Field of Classification Search
CPC .. H02J 7/025; H02J 50/10; H02J 50/80; H02J 7/0044; H04B 5/0037; H04B 5/0075; H04L 67/10; H04W 88/16; H04W 40/00
See application file for complete search history.

(56) References Cited

U.S. PATENT DOCUMENTS 9,961,483 B1* 5/2018 Berchanskiy ........... H02J 50/40
2005/0030921 A1 2/2005 Yau
(Continued)

FOREIGN PATENT DOCUMENTS

CN 104300646 B 7/2016

OTHER PUBLICATIONS

Extended European Search Report issued in European Application No. 18744781.8, dated Jul. 28, 2020, 8 pages.
(Continued)

*Primary Examiner* — Stacy Whitmore
(74) *Attorney, Agent, or Firm* — Volpe Koenig

(57) ABSTRACT

According to a first aspect of the present disclosed subject matter, a system for managing inductive charging of at least one device, the system comprising: at least one venue comprising: a plurality of charging spots each of which comprises a dedicated Bluetooth low energy (BLE) transceiver designed to enable communication between charging spots of the plurality of charging spots, wherein at least one charging spot of the plurality of charging spots is capable of being configured as a relay; at least one gateway comprising a BLE transceiver; wherein the gateway is capable of communicating, by its BLE transceiver, with each charging spot either directly or indirectly via the relay; and a cloud computing server configured to provide services to the at least one venue; and wherein the CCS is connected with at least one venue via the Internet.

20 Claims, 4 Drawing Sheets

(51) Int. Cl.
  *H02J 50/10*   (2016.01)
  *H04B 5/00*    (2006.01)
  *H04L 29/08*   (2006.01)
  *H04W 88/16*   (2009.01)
  *H04L 67/10*   (2022.01)

(52) U.S. Cl.
  CPC ............ *H04B 5/0075* (2013.01); *H04L 67/10* (2013.01); *H04W 88/16* (2013.01)

(56) References Cited

U.S. PATENT DOCUMENTS

| | | |
|---|---|---|
| 2010/0211643 A1 | 8/2010 | Lowenthal et al. |
| 2013/0005252 A1 | 1/2013 | Lee et al. |
| 2016/0269486 A1 | 9/2016 | Gupta et al. |
| 2017/0188179 A1* | 6/2017 | Laudebat ................. H04W 4/80 |
| 2017/0288739 A1 | 10/2017 | Shin et al. |
| 2018/0205417 A1* | 7/2018 | Raj .......................... H02J 50/10 |
| 2019/0181673 A1* | 6/2019 | Shirani-Mehr ......... H02J 7/025 |

OTHER PUBLICATIONS

International Preliminary Report issued in International Application No. PCT/IL2018/050092, dated Aug. 8, 2019, 8 pages.
International Search report and Written Opinion issued in International Application No. PCT/IL2018/050092, dated May 23, 2018, 10 pages.

* cited by examiner

WIRELESS CHARGING MANAGEMENT SYSTEM

CROSS-REFERENCE TO RELATED PATENT APPLICATIONS

This patent application is a U.S. National Phase filing under 35 U.S.C. § 371 of PCT Patent Application No. PCT/IL2018/050092, filed Jan. 24, 2018, which is based upon and claims the priority of U.S. Provisional Patent Application Ser. No. 62/450,586, each of which is incorporated herein by reference in its entirety.

TECHNICAL FIELD

The present disclosed subject matter relates to wireless power charging systems. More particularly, the present disclosed subject matter relates to remote management of a plurality of wireless power charging-spots.

BACKGROUND

Growing demand for wireless power charging, led to dramatic deployments increase, in a wide variety of venues, raises the need for effective remote management. Typically, a deployment of each venue consists of a plurality of charging-spots that are partially connected to one another. To maintain the expected services, allow or alter monetization options for each deployed infrastructure, software update, user authentication, or the like; some centralized management servers are needed. Currently, commercially available, systems are lacking proper communication between charging spots and management server. Such communication is needed to implement a conditional charging service for allowing charged devices that identify themselves and include proper credentials to be allowed service. This is also raises the need for reliable communication between the user device, the charge spot, neighboring spots and a centralized management server.

Some commercially available wireless power charging deployments provides for direct connection of each charging spots to the Internet either via long range radio technology or wired technology. In some of these deployments, the charging spots may be aggregated into a local area network (LAN), however utilizing connectivity which is both expensive and complicated. Moreover, such commercially available deployments can't provide for simple communication of the charging spots with user charged devices.

BRIEF SUMMARY

According to a first aspect of the present disclosed subject matter, a system for managing inductive charging of at least one device, the system comprising: at least one venue comprising: a plurality of charging spots each of which comprises a dedicated Bluetooth low energy (BLE) transceiver designed to enable communication between charging spots of the plurality of charging spots, wherein at least one charging spot of the plurality of charging spots is capable of being configured as a relay; at least one gateway comprising a BLE transceiver; wherein the gateway is capable of communicating, by its BLE transceiver, with each charging spot either directly or indirectly via the relay; and a cloud computing server configured to provide services to the at least one venue; and wherein the CCS is connected with at least one venue via the Internet.

In some exemplary embodiments, the communication between charging spots is done without pairing and wherein the gateway is capable of communicating with each charging spot is also done without pairing.

In some exemplary embodiments, charging spots situated within a BLE radio reach range of the gateway can communicate directly with the gateway.

In some exemplary embodiments, charging spots situated outside the BLE radio reach range of the gateway communicate with the gateway via at least one relay.

In some exemplary embodiments, the plurality of charging spots and the gateway of the venue are configured to support services defined by the CCS.

In some exemplary embodiments, each charging spot is capable of BLE communicating with at least one device that is placed on it and/or charged by it.

In some exemplary embodiments, wherein the gateway is further configured to communicate, over Wi-Fi, with the at least one device, having an application, in the venue for enabling services provided by the CCS.

In some exemplary embodiments, the at least one device, having an application, in the venue is capable of communicating via the Internet directly with the CCS, wherein the device is also capable of acting as a gateway of the venue, and wherein the device utilizes the charging spot it is placed on for communicating with the plurality of charging spots.

According to another aspect of the present disclosed subject matter, a cloud computing server configured to provide services selected from the group consisting of monitoring; configuration; control; software upgrades; and any combination thereof for a plurality of venue networks.

According to yet another aspect of the present disclosed subject matter, a method for routing messages in the system of claim 1, the method comprising: broadcasting a routing discovery message (RDM) from the gateway; receiving and rebroadcasting the RDM by each charging spot that received the RDM; determining at least one charging spot capable of being utilized as the relay; creating for the relay a BLE routing register message (RRM) registering at least one charging spot that use the relay for communicating with the gateway; forwarding the RRM to the gateway directly or via another relay having an RRM also registering the RRM of the forwarding the RRM; establishing a routing tree for bidirectional communication between the gateway and the charging spots, wherein the routing tree is based on at least one RRM; and wherein the bidirectional communication is based on advertising communication without pairing.

In some exemplary embodiments, wherein the routing messages further comprises routing messages selected from the group consisting of monitoring messages; configuration messages; control messages; and any combination thereof.

In some exemplary embodiments, wherein the rebroadcasting the RDM is done for reaching charging spots situated outside a BLE radio reach range of the gateway;

In some exemplary embodiments, wherein the determining is based on criteria selected from a group consisting of: a hop count; a received signal strength indication and a combination thereof of the at least one charging spot capable of being utilized as the relay, and wherein the hop count indicates an amount of RRMs, it is registered in.

In some exemplary embodiments, the method supports services defined by the CCS.

In some exemplary embodiments, the method further comprises Wi-Fi communication between the gateway and at least one device, having an application, in the venue for enabling services provided by the CCS.

In some exemplary embodiments, the method supports communication between each charging spot and a device placed on it.

In some exemplary embodiments, the method further comprises Internet communication between the at least one device, having an application, in the venue and the CCS directly.

In some exemplary embodiments, the method further comprises replacing the gateway functionality in the venue with the device, having an application, wherein the device utilizes the charging spot it is placed on for communicating with the plurality of charging spots.

According to yet another aspect of the present disclosed subject matter, a communication method of a charging spot comprising: receiving by the charging spot an RDM a source selected from a group consisting of: a gateway other charging spots; and any combination thereof, and rebroadcasting the RDM; determining the charging spot capability to be utilized as a relay; creating a BLE routing register message (RRM) by registering at least one other charging spots that utilize the charging spot as relay; forwarding the RRM to either the gateway or another charging spot that is utilized as a relay; and wherein the communication is based on advertising communication without pairing.

In some exemplary embodiments, the method supports communication with a user's device placed on it and inductively charged by it.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
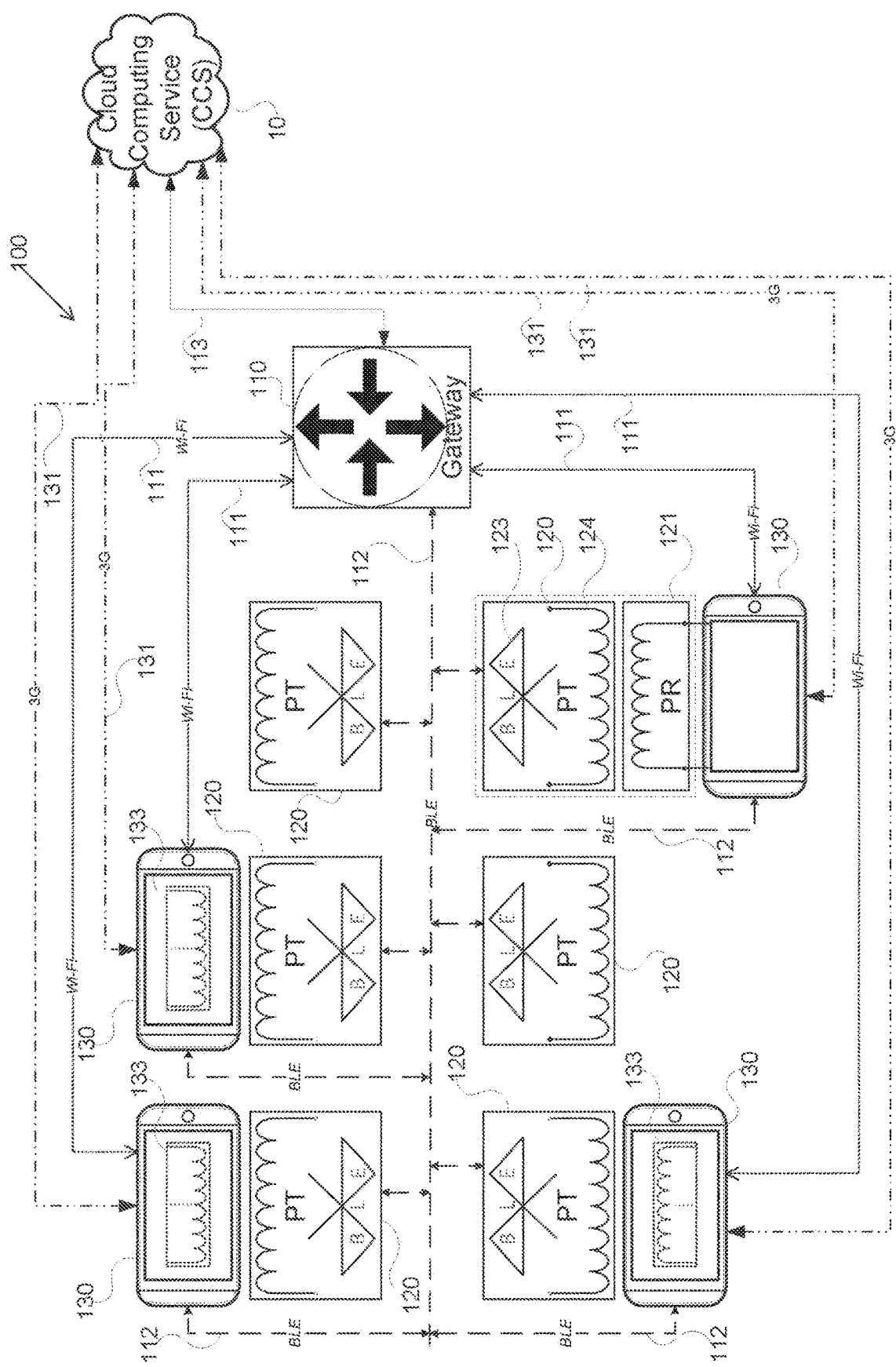
FIG. 1 shows a network architecture of wireless charging spots in a venue, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Referring now to FIG. 1, showing a network architecture of wireless charging spots in a venue 100, in accordance with some exemplary embodiments of the disclosed subject matter. Venue 100 may be situated in a public site, such as a restaurant, a coffee shop, an airport, a bus station; a train station, a bank, a school, a library, post office, official building, or the like. In some exemplary embodiments, at least one venue 100 may be deployed in each public site, wherein each venue 100 may comprise a plurality of wireless power charging spots (spot) 120.

Spot 120 is configured to wirelessly charge a user device (device) 130, such as a smartphone, a camera, a tablet PC, a notebook PC, cellular phone, augmented realty glasses, digital watch, or the like. Some devices 130 may comprise an embedded power receiver (PR)133 adapted to receive induced power from a power transmitter (PT) 124 of the spot 120 on which the device 130 is placed on. In some exemplary embodiments, spot 120 may comprise at least one Bluetooth Low Energy transceiver (Tx) 123. Additionally, spot 120 may comprise components (to be described in FIG. 2 below) adapted to provide energy to the PT124 and the Tx123. Alternatively, spot 120 may comprise an external power receiver (PR) 121, which may be loosely placed on spot 120. In some exemplary embodiments, PR121 may comprise components adapted to receive induced power from PT124. PR121 may also comprise a dongle, i.e. cable and a connector, designated to connect to a power jack of device 130 that doesn't comprise embedded receiver 133.

In some exemplary embodiments of the disclosed subject matter, Tx-123 may be a transceiver based on Bluetooth Low Energy (BLE) technology, designed for wireless privet area network applications. Compared to classic Bluetooth, BLE is intended to provide considerably reduced power consumption. Recently, mobile devices, such as device 130, incorporate BLE technology in addition to operating system; such as iOS™, Android™, Windows™, BlackBerry™, macOS™, Linux™; natively support BLE technology.

In some exemplary embodiments, spots 120 of venue 100 are deployed as a local network, in such way that all nodes, e.g. spots 120, in the local network may communicate with one another, thus forming a local area network (LAN) with the nodes of venue 100. It should be appreciated that, in the present discloser, venue 100 refers to a LAN comprised of a plurality of nodes, such as spots 120, that are capable of communicating with one another by utilizing BLE wireless technology over BLE wireless media 112. Additionally, or alternatively, each device 130 present in the venue 100 may be able to communicate with each spot 120 over the same BLE wireless media 112 (BLE 112). Thus, devices 130 present in the venue 100 (participating devices) are network elements of the LAN of the venue 100.

In some exemplary embodiments of the disclosed subject matter, at least one of the nodes of venue 100 may be a gateway 110. Gateway 110 may be a hardware device configured to interface with BLE wireless media 112, Ethernet (not shown) and Wi-Fi 111 on its LAN side and connect to the Internet via uplink 113 on its wide area network (WAN) side. In some exemplary embodiments, uplink 113 may utilize technologies, such as xDSL, cable service interface specification (DOCSIS), Ethernet, fiber optics, 3G/4G/5G wireless connection, any combination thereof, or the like. In some exemplary embodiments the gateway may use LAN technology such as Wi-Fi to connect to an additional gateway that provides access to the internet. In some exemplary embodiments, gateway 110 may be configured to facilitate routing information between nodes and between the nodes and the Internet. To do so, gateway 110 may utilize protocol translation/mapping for interconnecting networks having different protocol technologies.

It should be noted that, devices, such as device 130, are typically equipped with the capability of connecting directly to the Internet, via 3G 131, with its built-in 3G/4G/5G wireless connections. In some exemplary embodiments of the disclosed subject matter, at least one of device 130 may opportunistically undertake the gateway 110 duties for providing WAN connection to the Internet, thus partially acting as a gateway for venue 100.

It should also be noted that, BLE technology range is limited due to its relatively low power and simple coding. Therefore, in some venue deployments, the range of the BLE transmission may not be sufficient to cover all the spots in the venue. Consequently, a single gateway may not be able to reach (communicate) with all the spots directly over BLE 112.

One objective of the present disclosure is to overcome this insufficient range limitation by providing a set of routing methods for BLE messages that extends the gateway range for reaching all the spots in the venue. Another objective of the present disclosure is to enable communication between gateway 110, devices 130 and spots 120 over BLE 112 without user pairing. Yet another objective of the present disclosure is to configure an adequate tree-like structure for each venue network, based on standard BLE devices and very low overhead coding.

One of the primary criteria for tree-like structure configuration may be based on Tx-123 transceiver received signal strength indication (RSSI) of each spot 100. In some exemplary embodiments, a hopping scheme may be utilized to resolve reach limitation, over BLE 112, of spots that their RSSI falls below a predetermined threshold.

It should be noted that, in the present discloser the acronym "ORS" refers to spots 120 or other network elements that may be out of the gateway 110 radio reach. Thus, the Tx-123, of these ORS, may not be able to communicate directly with gateway 110, due to their distance from the gateway 110, which falls below BLE radio range.

In some exemplary embodiments, gateway 110 may utilize at least one spot to reach that their RSSI may fall below threshold. Namely, utilizing at least one spot 100 as a relay for communicating with the far-spot over BLE 112.

Additionally, or alternatively, gateway 110 may also utilize device 130 that is in close proximity to the ORS, as a relay for communicating with the far spot. In such embodiments, gateway 110 may communicate with the device 130 (relay) over Wi-Fi 131 and the gateway 110 relay the communication to ORS over BLE 112.

Cloud computing server (CCS) 10 may be group of networked elements providing services managed in a suite of hardware and software resources that may be visualize as an amorphous cloud. In some exemplary embodiments, CCS 10 may be accessed, over the Internet, by the plurality of spots 120 of a plurality of venue 100 and vise-versa. The CCS 10 may provide monitoring, configuration and control services and centralized management to the plurality deployed venues and their associated charging spots. In some exemplary embodiments, CCS 10 and a network of deployed venues 100 may enable implementation of conditional and/or selective charging services were only devices, such as device 130, having installed charging application with proper credentials may be granted a charge spot service.

Figure 2:
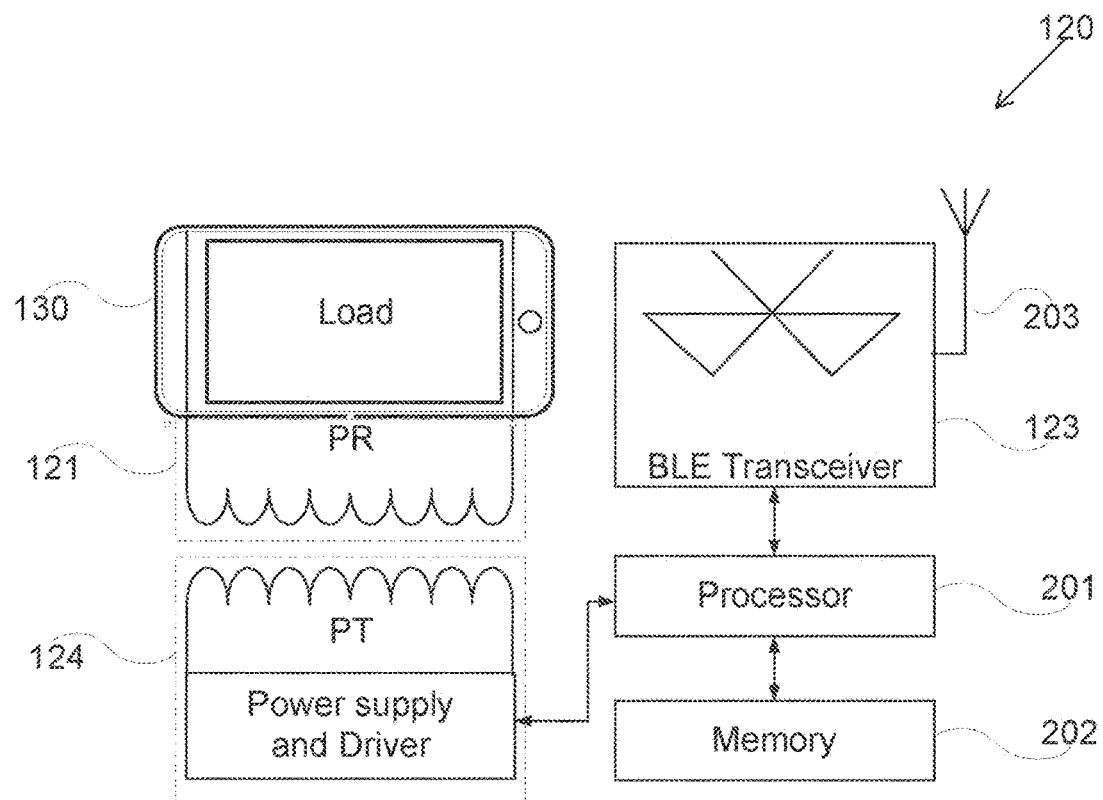
FIG. 2 shows a block diagram of a charging spot, in accordance with some exemplary embodiments of the disclosed subject matter.
Figure 3:
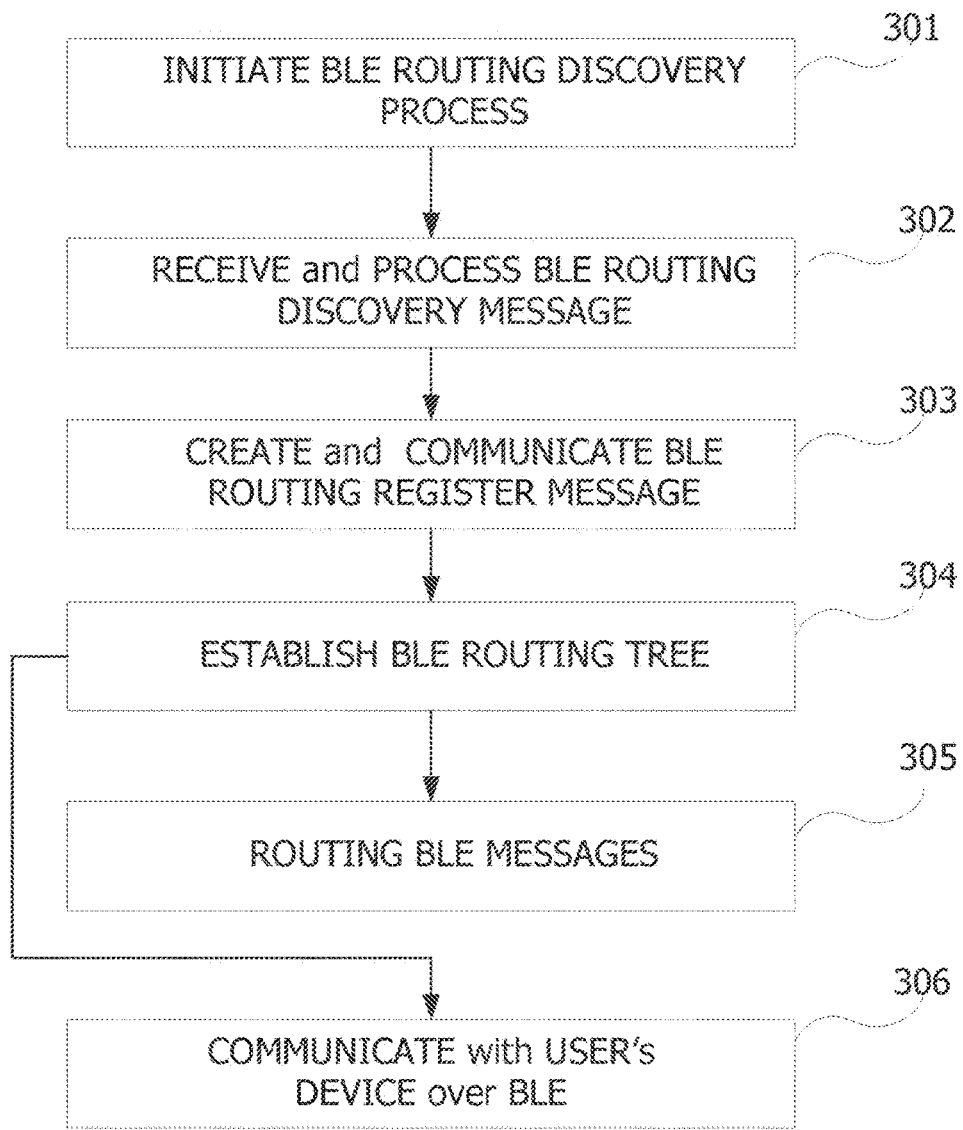
FIG. 3 shows a flowchart diagram of a method, in accordance with some exemplary embodiments of the disclosed subject matter.

Referring now to FIG. 2 showing a block diagram of a charging spot 120, in accordance with some exemplary embodiments of the disclosed subject matter. Spot 120 may be an electronic circuit adapted to perform methods such as depicted in FIG. 3 and transmit power to device 130.

In some exemplary embodiments, spot 120 may comprise a PT124 adapted to transmit, by induction, power to either PR121 or alternatively directly to device 130. PR 124 may comprise a power source and a driver configured to regulate and control the power induced to the power receiver.

In some exemplary embodiments, Spot 120 may comprise a processor 201. Processor 201 may be a central processing unit (CPU), a microprocessor, an electronic circuit, an integrated circuit (IC) or the like. Additionally, or alternatively, processor 201 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 201 may be utilized to perform computations required by Spot 120 or any of it subcomponents.

In some exemplary embodiments of the disclosed subject matter, spot 120 may comprise a BLE transceiver 123. Spot 120 may utilize the BLE transceiver 123 as an interface to transmit and receive information and instructions between spot 120 and network elements, such as a gateway 110, of FIG. 1, device 130, another spot 120, any combination thereof, or the like. BLE transceiver 123 may utilize an antenna 203 adapted to transmit and receive information in standard BLE frequencies spectrum.

In some exemplary embodiments, Spot 120 may comprise a memory 202. Memory 202 may be persistent or volatile memory. For example, memory 202 can be a flash disk, a random-access memory (RAM), a memory chip, a semiconductor storage device such as flash device, memory stick, or the like. In some exemplary embodiments, memory 202 may retain program code to activate processor 201 to perform acts associated with any of the steps shown in FIG. 3. Memory 202 may also be used to retain a user's information, connectivity software, monitoring information, configuration and control information and application associated with charging management of spot 120.

The components detailed below may be implemented as one or more sets of interrelated computer instructions, executed for example by Processor 201 or by another processor. The components may be arranged as one or more executable files, dynamic libraries, static libraries, methods, functions, services, or the like, programmed in any programming language and under any computing environment.

In some exemplary embodiments, processor 201 may be configured to acquire user's credentials from device 130 in order to authenticate users for granting and regulating charging services. In other exemplary embodiments, processor 201 may be configured to establish network routing, over BLE 112 of FIG. 1, with other network elements. In yet another exemplary embodiment, processor 201 may be configured to monitor and control the PR121.

Referring now to FIG. 3 showing a flowchart diagram of a method in accordance with some exemplary embodiments of the disclosed subject matter. The method of FIG. 3 may be executed, by gateway 110, for establishing a BLE routing network for venue 100 deployment. Furthermore, routing and forwarding, in the BLE routing network, may be based on a protocol that utilizes BLE advertising without explicit pairing between any of the network elements.

The BLE routing network (BRN) may be comprised of network elements; such as a plurality of Tx-123; at least one device 130; at least one gateway 110; or the like. Each Tx-123 may be configured to support at least one spot 120. In some exemplary embodiments, all network elements may comply with BLE radio frequencies of BLE112 media to enable transmitting and receiving (communicating) information, between all network elements, over BLE 112 media.

In Step 301, a BLE routing discovery process may be initiated by gateway 110 broadcasting (advertising) a routing discovery message (RDM). In some exemplary embodiments, the RDM shall be rebroadcasted by all network elements that received the RDM in order to facilitate reception of the RDM by ORS Tx-123.

It will be noted that the term "BLE routing" refers, in the present discloser, to passing messages, having information, between BLE network elements; such as gateway 110; device 130; Tx-123, of spot 120; any combination thereof, or the like. In some exemplary embodiments, the media on which the messages are communicating may utilize wireless BLE technology, such as for example BLE 112, of FIG. 1.

Upon reception of RDM all Tx-123, network elements, may respond back to gateway 110 either directly or indirectly, via another Tx-123 (relay), in the case of ORS Tx-123. In exemplary embodiments, that a Tx-123 may receive the RDM from more than one network element, the Tx-123 may select the best route to respond to gateway 110 (to be described in detail further below).

It should be noted that, the term "relay" refers in the present disclosure to a Tx-123 or other network elements that convey communication between gateway 110 and an ORS Tx-123. In some exemplary embodiments, more than one relay may be required to reach an ORS Tx-123. It will be also noted that, the term "hop" is used in the present disclosure for each time a message passes between two Tx-123 or the gateway 110 and any Tx-123. In some exemplary embodiments, the best route, of an ORS Tx-123, for communicating (responding) with gateway 110 may be selected according to the number of hops, RSSI index, any combination thereof, or the like; wherein a minimum number of hops and higher RSSI index are preferred.

In some exemplary embodiments of the disclosed subject matter, a relay, which receives response messages, register the Tx-123 address that originated the response message and use that address for forwarding all future gateway 110 broadcast or unicast message.

In Step 302, a BLE RDM may be received and processed by a Tx-123. In some exemplary embodiments, the RDM may be addressed to a specific Tx-123, all Tx-123 in a venue (broadcasted), any combination thereof, or the like. The RDM may be comprised of at least one string of bytes that incorporate denoted information; such as destination address and an RSSI threshold, defining a minimal reception RSSI, for considering a hop to be a valid path, i.e. avoid messages losses.

Additionally, or alternatively, the string of bytes of the RDM may also incorporate the following denoted information:

| Denoted Information | Meaning |
| --- | --- |
| venue ID | Indicates current venue address or assigned venue ID |
| hop number | Initially set to "0" when transmitted by the gateway 110, then incremented by for each hop. |
| repeat count | Number of iteration to be repeated by Tx-123 when forwarding a message |
| repeat interval | Indicates the time interval for a repeat iteration |
| wait register interval | Preset delay time of the Tx-123's response to allow for far reach Tx-123 shall transmit first |
| wait report interval | Basic wait interval for route report message sending (in 100 msec intervals) see details below |
| max hops | Maximum allowed number of hops for routing a message |
| Monitoring Interval | Time interval indicating minimum delay time prior to forwarding monitoring message. |

In some exemplary embodiments, following the RDM reception a Tx-123 that received an RDM, performs pre-advertising process, comprising: copying the RDM content, replaces the destination address of the RDM with its own address and increment it's hop counter by one. Then, the Tx-123 starts advertising by setting the RDM as its own beacon and transmit the modified RDM, as many times as set in the {repeat count}, providing that the hop counter value is smaller than the {max hops}.

In some exemplary embodiments, the Tx-123 may set a scan timer; which is equal to the multiplication of {Repeat Count} by {Repeat Interval} and by {Max Hop}; and continue scanning for additional RDMs. If the Tx-123 receives a new RDM having a {Hop Count} smaller than the {Hop Count} of the Tx-123 last transmission, the Tx-123 shall stop the advertising and reperform pre-advertising process with the new RDM, then restart advertising all over again. In some exemplary embodiments, after the scan time is up the Tx-123 may select a route based on the RDM having lowest hop number, highest received RSSI, any combination thereof, or the like.

In some exemplary embodiments, the Tx-123 may delay its route register message response to either a selected Tx-123 or the gateway 110 (to be described in detail further below) for additional delay time. The delay, may be equal to the multiplication of {Wait Register Interval} by {{Max hops} minus {Current Hop count}}, wherein the current hop count is the number of hops of the selected route.

In exemplary embodiments, where the RDM may be targeted for venue installation, the Tx-123 may adopt the included {Venue ID} in the message as its own {Venue ID} for all further communication. On the other hand, RDM targeted for venue uninstallation causes the Tx-123 to clear stored venue ID and all routing information. The clearing will be performed only after repetition of message according to the steps 301 and 302 depicted above.

In Step 303, a BLE route register message (RRM) may be created and communicated. In some exemplary embodiments, the RRM may be formulated and advertised by each Tx-123. A portion of the RRMs may be communicated directly to gateway 110, while the rest may be communicated to a relay, i.e. other Tx-123. It should be noted that, the RRM advertisement may be done in an order where Tx-123, having higher hop count, (far Tx-123) are first to advertise and Tx-123 with one hop are last.

In some exemplary embodiments, the RRM of a given Tx-123 may be comprised of at least one string of bytes that incorporate address of all the Tx-123 that are routed through it, any given Tx-123 used as a relay.

In Step 304, a BLE routing tree may be established. In some exemplary embodiments, gateway 110 may establish the routing tree based on the registration messages that were received from the plurality of Tx-123.

In step 305, messages may be routed in the BLE routing tree. In some exemplary embodiments, messages may comprise, however not limited to, monitoring messages, control messages, configuration messages, any combination thereof, or the like.

Following the routing tree establishment, each Tx-123 registered for routing may scan for broadcast messages and advertising messages, addressed to: itself, Txs-123 that use it as relay, gateway 110, any combination thereof, or the like. In some exemplary embodiments, each Tx-123 may retain an elapsed timer, indicating time passed since last forwarding, of each Tx-123 that, directly and/or indirectly, uses it as a relay.

In some exemplary embodiments of the disclosed subject matter, a monitoring message may be received, by a relay, from a Tx-123 that is directly and/or indirectly registered in the relay's list. The relay may forward the monitoring message to either another relay, it's registered with, or gateway 110, providing that a value of the elapsed timer, associated with Tx-123 that forwarded the monitoring message, is greater than the value of the {Monitoring Interval} sent in the RDM. Following the monitoring message forwarding the elapsed timer may be reset to zero. In some exemplary embodiments, messages, other than monitoring messages, addressing gateway 110 may be forwarded unconditionally. It should be noted that; in the case of forwarding messages addressed to the gateway, monitoring or else; a relay may modify the destination address of the message to the address of either another relay, it's registered with, or gateway 110.

In some exemplary embodiments of the disclosed subject matter, configuration messages, and control messages originating at the gateway 110 may be forwarded to all Tx-123 in the routing tree or to a specific Tx-123. These configuration and control messages addressing Txs-123 that are not directly registered with the gateway, may be routed in the routing three via at least one relay, wherein the relay may alter the, configuration and control messages, address according with its registration list.

In some exemplary embodiments of the disclosed subject matter, monitoring messages comprise information associated with the status of spot 120, having a Tx-123 connected to it. The status of spot 120 may comprise health information, such as power-supply stability, surface temperature, over current, over voltage, foreign object detection, usage statistics, any combination thereof, or the like. The monitoring, of spot 120, may be conducted continuously or periodically, as instructed by the configuration and control messages of gateway 110. In some exemplary embodiments, the status information may be stored in memory 202, of FIG. 2, and may be retrieved for forwarding to the gateway 110, upon the gateway 110 request. Additionally, or alternatively, each Tx-123 of each spot 120 may, periodically or continuously, forward its statues to the gateway. In some exemplary embodiments, the status information obtained by the gateway 110 may be forwarded to CCS 10, also CCS 10 may query the status of at least one spot 120 via gateway 110.

In some exemplary embodiments of the disclosed subject matter, configuration and control messages may comprise instructions, originated at the gateway 110 and intended for configuring and controlling a spot 120 operation. These instructions allow for: setting access policies; allowed technologies, e.g. WPC & PMA); charge duration, over the air (OTA) software upgrade; any combination thereof, or the like; for any Tx 123 in the routing tree. In some exemplary embodiments, the OTA software upgrades may be implemented as a separate service and would be based on paring and establishment of connection between gateway 110 and a specific Tx 123. Additionally, or alternatively, the instructions may be initiated at the CCS 10 and they may comprise requesting from spot 120 to provide additional information in addition to the instructions depicted above.

In step 306, user's device, such as device 130 may communicate, over BLE, with a Tx-123 of the spot 120 that charges a user's device. In some exemplary embodiments, the Tx-123 may be configured to authenticate device 130, having a charging application, for charging service as well as setting the level of service, e.g. Conditional charging allowance.

In some exemplary embodiments, the charging application of device 130 may be utilized as a proxy of CCS 10. In such embodiments the charging application may be able to collect monitoring status information from at least one Tx 123 in venue 100. Additionally, or alternatively, the charging application of device 130 may also be utilized to send configuration and control messages during a charging session.

In exemplary embodiments, where gateway 110 may be absence, a device 130 (equipped with charging application) placed on a specific spot 120 may be used to substitute part of the gateway 110 duties, which may comprise obtaining configuration and control instructions from CCS 10 and convey them to the spot 120. Similarly, this device 130 may be able to obtain the spot 120 status information and convey it to CCS 10.

Figure 4:
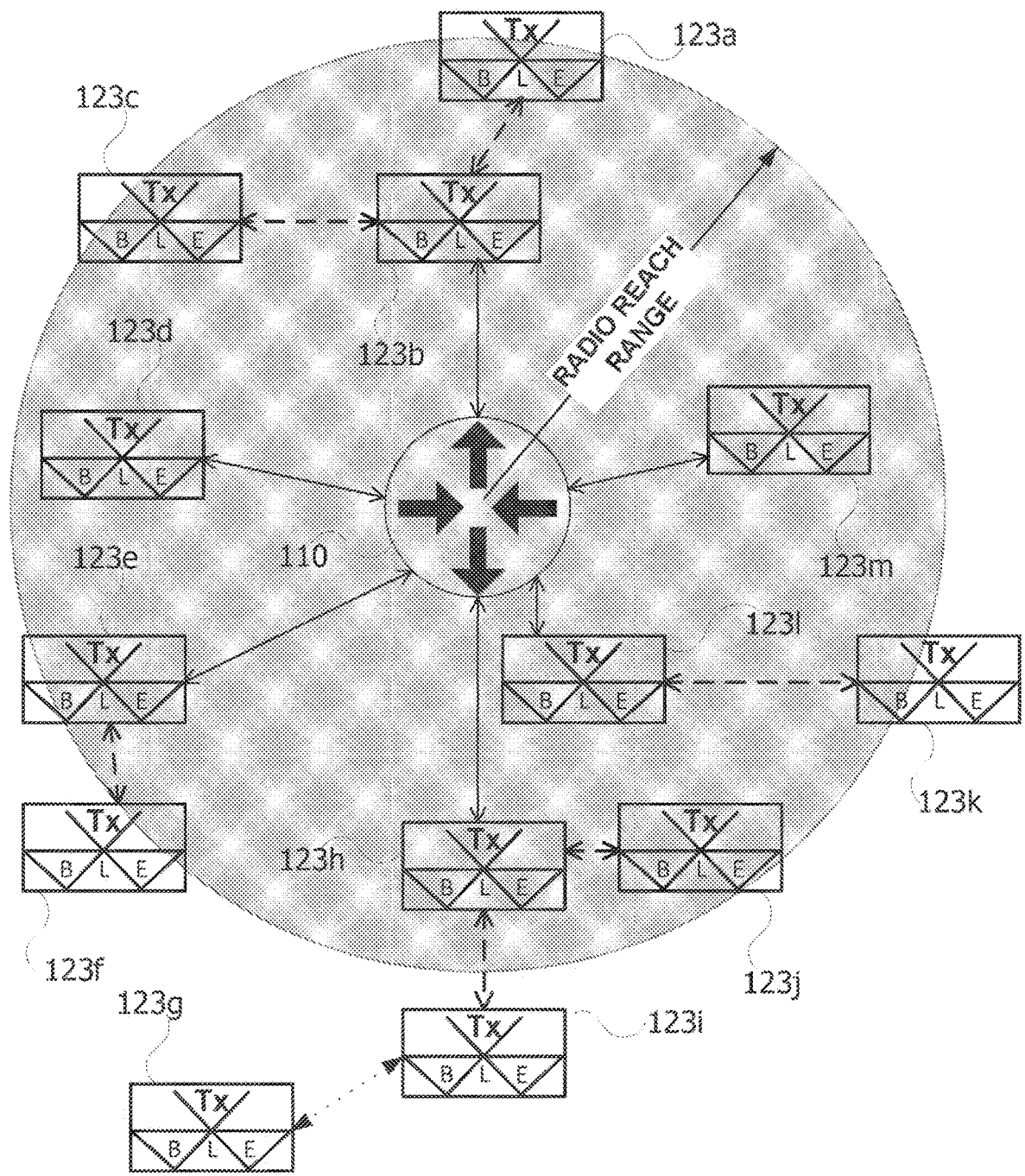
FIG. 4 illustrates a physical deployment of charging spots with respect to a radio reach range of a gateway, in accordance with some exemplary embodiments of the disclosed subject matter.

Referring now to FIG. 4 illustrating a physical deployment of a plurality of charging spots 120 with respect a radio reach range of a gateway 110, in accordance with some exemplary embodiments of the disclosed subject matter. Each a charging spot of the plurality of charging spots may be represented by a Tx-123. In some exemplary embodiments, Tx-123*a* trough Tx-123*m* may be identical transceivers, however each may be located in different range with respect to the radio reach range of the gateway 110.

In some exemplary embodiments, a portion of the Tx-123 transceivers may be situated outside the gateway 110 radio range, such as for example: Tx-123*a*, Tx-123*c* Tx-123*e*, Tx-123*f*, Tx-123*g*, Tx-123*i*, Tx-123*j* and Tx-123*k*. For that reason, nearby Tx-123 transceivers may be utilized as relays for enabling communication between all Tx-123 with gateway 110. As previously described in the present disclosure, each path between to network elements, utilizing BLE communication, is described a hop. In some exemplary embodiments, the Tx-123 listed above, i.e. situated outside the gateway 110 radio range, may pass more than one hop in order to communicate with the gateway.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A system for managing inductive charging of at least one device, the system comprising:
at least one venue comprising:
a plurality of charging spots, each of which comprises a dedicated Bluetooth low energy (BLE) transceiver designed to enable communication between charging spots of the plurality of charging spots, wherein at least one charging spot of the plurality of charging spots is capable of being configured as a relay; and
at least one gateway comprising a BLE transceiver, wherein the gateway is capable of communicating, by its BLE transceiver, with each charging spot either directly or indirectly via the relay; and
a cloud computing server (CCS) configured to provide services to the at least one venue, wherein the CCS is connected with at least one venue via the Internet.

2. The system of claim 1, wherein said communication between charging spots is done without pairing and wherein said gateway is capable of communicating with each charging spot also without pairing.

3. The system of claim 1, wherein charging spots situated within a BLE radio reach range of the gateway can communicate directly with the gateway.

4. The system of claim 3, wherein charging spots situated outside the BLE radio reach range of the gateway communicate with the gateway via at least one relay.

5. The system of claim 1, wherein the plurality of charging spots and the gateway of the venue are configured to support services defined by the CCS.

6. The system of claim 1, wherein each charging spot is capable of BLE communicating with at least one device that is placed on it and/or charged by it.

7. The system of claim 6, wherein the gateway is further configured to communicate, over Wi-Fi, with the at least one device, having an application, in the venue for enabling services provided by the CCS.

8. The system of claim 6, wherein the at least one device, having an application, in the venue is capable of communicating via the Internet directly with the CCS, wherein the device is also capable of acting as a gateway of the venue, and wherein the device utilizes the charging spot it is placed on for communicating with the plurality of charging spots.

9. The system of claim 1, wherein the cloud computing server is configured to provide services selected from the group consisting of monitoring; configuration; control; software upgrades; and any combination thereof for a plurality of venue networks.

10. A method for routing messages in the system of claim 1, the method comprising:
broadcasting a routing discovery message (RDM) from the gateway;
receiving and rebroadcasting the RDM by each charging spot that received the RDM;
determining at least one charging spot capable of being utilized as said relay;
creating for said relay a BLE routing register message (RRM) registering at least one charging spot that uses said relay for communicating with the gateway;
forwarding the RRM to the gateway directly or via another relay having an RRM also registering the RRM of said forwarding the RRM; and
establishing a routing tree for bidirectional communication between the gateway and the charging spots, wherein the routing tree is based on at least one RRM wherein said bidirectional communication is based on advertising communication without pairing.

11. The method of claim 10, wherein said routing messages further comprises routing messages selected from the group consisting of monitoring messages;
configuration messages; control messages; and any combination thereof.

12. The method of claim 10, wherein said rebroadcasting the RDM is done for reaching charging spots situated outside a BLE radio reach range of the gateway.

13. The method of claim 10, wherein the determining is based on criteria selected from the group consisting of a hop count, a received signal strength indication, and a combination thereof of the at least one charging spot capable of being utilized as said relay, and wherein the hop count indicates an amount of RRMs it is registered in.

14. The method of claim 10 which supports services defined by the CCS.

15. The method of claim 10, which further comprises Wi-Fi communication between the gateway and at least one device, having an application, in the venue for enabling services provided by the CCS.

16. The method of claim 10 which supports communication between each charging spot and a device placed on it.

17. The system of claim 16, which further comprises Internet communication between the at least one device, having an application, in the venue and the CCS directly.

18. The system of claim 17, which further comprises replacing the gateway functionality in the venue with the device, having an application, wherein the device utilizes the charging spot it is placed on for communicating with the plurality of charging spots.

19. A communication method of a charging spot comprising:

receiving by the charging spot an RDM from a source selected from the group consisting of a gateway, other charging spots; and any combination thereof, and rebroadcasting the RDM;

determining the charging spot capability to be utilized as a relay;

creating a BLE routing register message (RRM) by registering at least one other charging spot that utilizes the charging spot as a relay; and forwarding the RRM to either the gateway or another charging spot that is utilized as a relay, wherein said communication is based on advertising communication without pairing.

20. The method of claim 19 which supports communication with a user's device placed on it and inductively charged by it.

* * * * *